US010852550B2

(12) United States Patent
Lee et al.

(10) Patent No.: US 10,852,550 B2
(45) Date of Patent: Dec. 1, 2020

(54) HEAD-MOUNTED DISPLAY DEVICE

(71) Applicant: LG ELECTRONICS INC., Seoul (KR)

(72) Inventors: Haklim Lee, Seoul (KR); Sanghyuk Im, Seoul (KR); Sunglyong Cha, Seoul (KR); Jongbeom Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 16/334,684

(22) PCT Filed: Sep. 20, 2016

(86) PCT No.: PCT/KR2016/010440
§ 371 (c)(1),
(2) Date: Mar. 19, 2019

(87) PCT Pub. No.: WO2018/056473
PCT Pub. Date: Mar. 29, 2018

(65) Prior Publication Data
US 2020/0310119 A1 Oct. 1, 2020

(51) Int. Cl.
G02B 27/01 (2006.01)

(52) U.S. Cl.
CPC ..... G02B 27/0172 (2013.01); G02B 27/0176 (2013.01)

(58) Field of Classification Search
CPC .......... G02B 27/0179; G02B 27/0176
See application file for complete search history.

(56) References Cited

U.S. PATENT DOCUMENTS

| 2012/0127062 A1 | 5/2012 | Bar-Zeev et al. |
| 2014/0340285 A1* | 11/2014 | Hiraide ............. G02B 27/0179 345/8 |
| 2015/0138645 A1* | 5/2015 | Yoo ................... G02B 27/0149 359/630 |
| 2015/0364133 A1* | 12/2015 | Freeman ............. G06F 40/263 704/254 |
| 2017/0102549 A1* | 4/2017 | Lee ................... G02B 27/0172 |

FOREIGN PATENT DOCUMENTS

| JP | 6-315121 A | 11/1994 |
| KR | 10-1579130 B1 | 12/2015 |
| KR | 10-2016-0026816 A | 3/2016 |
| KR | 10-2016-0033926 A | 3/2016 |
| KR | 10-1635892 B1 | 7/2016 |

* cited by examiner

Primary Examiner — Kevin M Nguyen
(74) Attorney, Agent, or Firm — Birch, Stewart, Kolasch & Birch, LLP

(57) ABSTRACT

The present invention relates to an HMD, the HMD comprising: a display barrel provided on the body and having a display arranged on one side thereof; a lens barrel for adjusting a focal point by movement relative to the display barrel; and a sealing portion provided between the display barrel and the lens barrel to maintain the airtightness of a space between the display barrel and the lens barrel, wherein the sealing portion has at least one end coupled to the outer circumferential surface of the display barrel, and is expanded and contracted according to the movement of the display barrel.

14 Claims, 13 Drawing Sheets

HEAD-MOUNTED DISPLAY DEVICE

CROSS REFERENCE TO RELATED APPLICATIONS

This application is the National Phase of PCT International Application No. PCT/KR2016/010440, filed on Sep. 20, 2016, which is hereby expressly incorporated by reference into the present application.

TECHNICAL FIELD

The present invention relates to a head mounted display device having a configuration for preventing introduction of foreign materials.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player.

Meanwhile, a head mounted display (HMD) device sometimes needs to adjust a focal point so that it can be worn by all users. At this time, it is necessary to move a lens or a display to adjust the focal point. However, foreign materials such as dust are introduced into the HMD from outside during this process.

DETAILED DESCRIPTION OF THE DISCLOSURE

The present invention is directed to solving the aforementioned problems and other drawbacks. Another aspect of the present invention is directed to preventing foreign materials from entering into a space generated by movement of a display.

In order to achieve the aspects of the present invention, there is provided with a head mounted display (HMD) device, including a body, a display barrel provided on the body and having a display disposed on one side thereof, a lens barrel configured to adjust a focal point by relative movement to the display barrel, and a sealing portion provided between the display barrel and the lens barrel so as to maintain airtightness of a space between the display barrel and the lens barrel, wherein the sealing portion has at least one end portion coupled to an outer circumferential surface of the display barrel and is expanded and contracted according to movement of the display barrel.

According to one aspect of the present invention, the HMD device may further include a wheel coupled to the body and threaded on an outer circumference thereof, a screw coupled to the wheel so as to convert a rotational motion of the wheel to a linear motion, and a frame coupled to the screw so as to move together with the display barrel according to movement of the screw.

According to one aspect of the present invention, the frame may be provided with guide shafts on a plurality of positions thereof to guide movement of the frame, and the guide frame may be moved on the guide shaft.

According to one aspect of the present invention, the guide shaft may be provided with a bushing on an outer circumference thereof to maintain airtightness of a space between the body and the guide shaft.

According to one aspect of the present invention, the guide shaft may be provided with at least one groove formed on an outer circumference thereof, and a pin having a shape corresponding to the groove may be provided on an inner circumferential surface of the body, on which the guide shaft is moved.

According to one aspect of the present invention, the lens barrel may be fixed to the body, and provided with a link member formed in a pentagraph shape and having one side fixed to the lens barrel and another side fixed to the display barrel.

According to one aspect of the present invention, the sealing portion may have one end portion coupled to the outer circumferential surface of the display barrel and another end portion coupled an outer circumferential surface of the lens barrel.

According to one aspect of the present invention, the sealing portion may be a corrugate tube.

According to one aspect of the present invention, the sealing portion may be a rubber member.

According to one aspect of the present invention, the sealing portion may be formed in a cylindrical shape that covers the display barrel, and have a diameter changed along one direction.

According to one aspect of the present invention, the display barrel may be provided with a flange portion formed on the outer circumferential surface thereof, and the sealing portion may be an O-ring that covers the flange portion and moves on an inner circumferential surface of the lens barrel.

According to one aspect of the present invention, the display barrel may be provided with a flange portion formed on the outer circumferential surface thereof, and the sealing portion may be a rubber member having one end portion covering the flange portion and another end portion closely attached on the display barrel.

According to one aspect of the present invention, the HMD device may further include a wheel cap disposed between the wheel and the body.

According to one aspect of the present invention, the guide shaft may slidably move along a through hole formed through the body.

EFFECTS OF THE DISCLOSURE

Hereinafter, effects of an HMD according to the present invention are as follows.

According to at least one of embodiments of the present invention, it may be advantageous that a field of view (FOV) can be maintained as a distance between eyes and a lens is maintained by moving a position of a display to adjust a focal point.

According to at least one of embodiments of the present invention, it may be advantageous that a rotational motion of a wheel is evenly distributed by converting the rotational motion of the wheel to a linear motion via a screw and by forming guide shafts at a plurality of positions.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

BEST MODE OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

The HMD 100 described in this specification may include a wearable device (e.g., a smart glass) and the like.

However, it will be easily understood by those skilled in the art that the configuration according to the embodiments described herein, unless otherwise limited to a case of being applicable only to the HMD, may be applied to mobile terminals, such as mobile phones, smart phones, laptop computers, digital broadcasting terminals, personal digital assistants (PDAs), personal digital assistants (PMPs), navigation systems, slate PCs, tablet PCs, ultrabooks, smartwatches, and the like.

Figure 1:
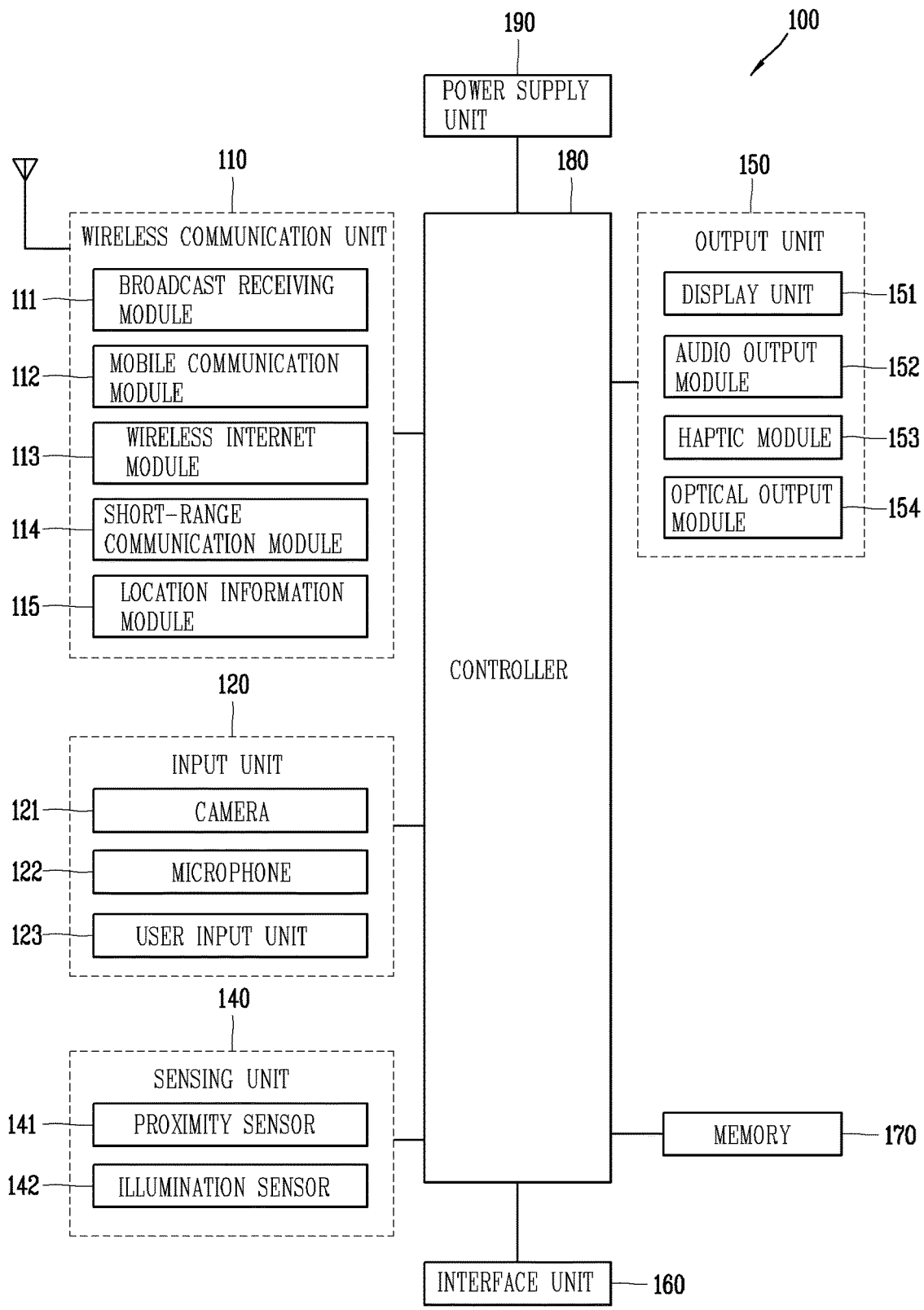
FIG. 1 is a block diagram of a head mounted display (HMD) according the present invention.

Referring to FIG. 1, FIG. 1 is a block diagram of a head mounted display (HMD) in accordance with the present invention.

The HMD 100 may be shown having components such as a wireless communication unit 110, an input unit 120, a sensing unit 140, an output unit 150, an interface unit 160, a memory 170, a controller (or control unit) 180, and a power supply unit 190. It is understood that implementing all of the illustrated components is not a requirement, and that greater or fewer components may alternatively be implemented.

More specifically, among those components, the wireless communication unit 110 may include at least one module for allowing wireless communication between the HMD 100 and a wireless communication system, between the HMD 100 and another HMD, between the HMD 100 and a mobile or stationary terminal, between the HMD 100 and a control device, between the HMD 100 and a camera externally installed to perform wireless communication, or between the HMD 100 and an external server.

Further, the wireless communication unit 110 may typically include one or more modules which connect the HMD 100 to one or more networks.

The wireless communication unit 110 may include at least one of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the HMD, the surrounding environment of the HMD, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The HMD disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154.

The interface unit 160 serves as an interface with various types of external devices that are coupled to the HMD 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the HMD 100 may perform assorted control functions associated with a connected external device, in response to the external device being connected to the interface unit 160.

The memory 170 is typically implemented to store data to support various functions or features of the HMD 100. For instance, the memory 170 may be configured to store application programs executed in the HMD 100, data or instructions for operations of the HMD 100, and the like. Some of these application programs may be downloaded from an external server via wireless communication. Other application programs may be installed within the HMD 100 at time of manufacturing or shipping, which is typically the case for basic functions of the HMD 100 (for example, receiving a call, placing a call, receiving a message, sending a message, and the like). Application programs may be stored in the memory 170, installed in the HMD 100, and executed by the controller 180 to perform an operation (or function) for the HMD 100.

The controller 180 typically functions to control an overall operation of the HMD 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1, to execute an application program that have been stored in the memory 170. In addition, the controller 180 may control at least two of those components included in the HMD to activate the application program.

The power supply unit 190 may be configured to receive external power or provide internal power in order to supply appropriate power required for operating elements and components included in the HMD 100. The power supply unit 190 may include a battery, and the battery may be configured to be embedded in the terminal body, or configured to be detachable from the terminal body.

At least part of the components may cooperatively operate to implement an operation, a control or a control method of an HMD according to various embodiments disclosed herein. Also, the operation, the control or the control method of the HMD may be implemented on the HMD by an activation of at least one application program stored in the memory 170.

Hereinafter, description will be given in more detail of the aforementioned components with reference to FIG. 1, prior to describing various embodiments implemented through the HMD 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be provided in the HMD 100 to facilitate simultaneous reception of two or more broadcast channels, or to support switching among broadcast channels.

The broadcast management server may be a server that generates and transmits a broadcast signal and/or broadcast associated information or a server that receives a previously generated broadcast signal and/or broadcast associated information and transmits the same to a device (e.g., a control device, a terminal, etc.) which is connected to the HMD to control the HMD. The broadcast signal may include a TV broadcast signal, a radio broadcast signal, a data broadcast signal, and the like. Also, the broadcast signal may further include a broadcast signal in a form that a TV or radio broadcast signal is combined with a data broadcast signal.

The broadcast signal may be encrypted by at least one of technical standards (or broadcasting methods, e.g., ISO, IEC, DVB, ATSC, etc.) for transmitting and receiving a digital broadcast signal. The broadcast receiving module 111 may receive the digital broadcast signal using a method suitable for a technical standard selected from those technical standards.

Examples of the broadcast associated information may include information associated with a broadcast channel, a broadcast program, a broadcast service provider, and the like. The broadcast associated information may be provided via a mobile communication network. In this case, the broadcast associated information may be received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like. The broadcast signal and/or the broadcast related information received through the broadcast receiving module 111 may be stored in the memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports, through wireless area networks, wireless communications between the HMD 100 and a wireless communication system, between the HMD 100 and another HMD, between the HMD 100 and a mobile or stationary terminal, between the HMD 100 and a control device, between the HMD 100 and a camera externally installed to perform wireless communication, or between the HMD 100 and an external server. One example of the wireless area networks is a wireless personal area networks.

Here, the HMD may be a device (e.g., a mobile phone, a smart phone, a smartwatch, a laptop computer, a controller, etc.) which can exchange data with (or cooperative with) the HMD 100. The short-range communication module 114 may sense (or recognize) a device, which can perform communication with the HMD 100, in the vicinity of the HMD 100. In addition, when the sensed device is a device which is authenticated to communicate with the HMD 100, the controller 180, for example, may cause transmission of at least part of data processed in the HMD 100 to the device or at least part of data processed in the device to the HMD 100 via the short-range communication module 114.

Hence, a user of the HMD 100 may use the data processed in the device through the HMD 100. For example, when a call is received in the device, the user may answer the call using the HMD 100. Also, when a message is received in the device, the user may check the received message using the HMD 100.

The location information module 115 is a module for acquiring a position (or a current position) of the HMD 100. As an example, the location information module 115 includes a Global Position System (GPS) module or a Wi-Fi module. For example, when the HMD uses a GPS module, a position of the HMD may be acquired using a signal sent from a GPS satellite. As another example, when the HMD uses the Wi-Fi module, a position of the HMD may be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the HMD. The location information module 115 is a module used for acquiring the position (or the current position) of the HMD, and may not be limited to a module for directly calculating or acquiring the position of the HMD.

Next, the input unit 120 is configured to permit various types of inputs to the HMD 100. Examples of such inputs include image information (or signal), audio information (or signal), data or various information input by a user, and may be provided with one or a plurality of cameras 121. Such cameras 121 may process image frames of still pictures or video obtained by image sensors in a video or image capture mode. The processed image frames can be displayed on the display unit 151 or stored in memory 170. Meanwhile, the cameras 121 provided in the HMD 100 may be arranged in a matrix configuration to permit a plurality of images having various angles or focal points to be input to the HMD 100. Also, the cameras 121 may be located in a stereoscopic arrangement to acquire left and right images for implementing a stereoscopic image.

The microphone 122 processes an external audio signal into electric audio (sound) data. The processed audio data may be processed in various manners according to a function being executed in the HMD 100. If desired, the microphone 122 may include assorted noise removing algorithms to remove unwanted noise generated in the course of receiving the external audio signal.

The user input unit 123 is a component that permits input by a user. Such user input may enable the controller 180 to control an operation of the HMD 100. The user input unit 123 may include one or more of a mechanical input element (for example, a mechanical key, a button located on a front and/or rear surface or a side surface of the HMD 100, a dome switch, a jog wheel, a jog switch, and the like), or a touch-sensitive input element, among others. As one example, the touch-sensitive input element may be at least one of a touch pad and a touch panel.

The sensing unit 140 is generally configured to sense one or more of internal information of the HMD, surrounding environment information of the HMD, user information, or the like, and generate a corresponding sensing signal. The controller 180 generally cooperates with the sending unit 140 to control operation of the HMD 100 or execute data processing, a function or an operation associated with an application program installed in the HMD 100 based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the HMD covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch-sensitive input element of the user input unit 123 is implemented as a capacitance type, the proximity sensor 141 may sense proximity of a pointer having conductivity by changes of an electromagnetic field, which is responsive to an approach of the pointer. In this case, the user input unit 123 itself may also be categorized as a proximity sensor.

The term "proximity touch" will often be referred to herein to denote a motion (action) that the pointer is closely located above the user input unit 123 without being in contact with the user input unit 123. The term "contact touch" will often be referred to herein to denote a motion (action) that the pointer is actually brought into contact with the user input unit 123. For the position corresponding to the proximity touch of the pointer relative to the user input unit 123, such position will correspond to a position where the pointer is perpendicular to the user input unit. The proximity sensor 141 may sense proximity touch, and proximity touch patterns (for example, distance, direction, speed, time, position, moving status, and the like). In general, the controller 180 processes data corresponding to proximity touches and proximity touch patterns sensed by the proximity sensor 141, and cause output of visual information on the display unit 151. In addition, the controller 180 may control the HMD 100 to execute different operations or process different data (or information) according to whether a touch with respect to the same point on the user input unit 123 is either a proximity touch or a contact touch.

A touch sensor senses a touch (or a touch input) applied to the user input unit 123 using at least one of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the user input unit 123, or convert capacitance occurring at a specific part of the user input unit 123, into electric input signals. The touch sensor may also be configured to sense a touch position, a touch area, touch pressure, touch capacitance when a touch object touches the user input unit 123. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the user input unit 123 has been touched. Here, the touch controller may be a component separate from the controller 180, the controller 180, and combinations thereof.

Meanwhile, the controller 180 may execute the same or different controls according to a type of touch object that touches the user input unit 123. Whether to execute the same or different control according to a type of a touch object may be decided based on a current operating state of the HMD 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the HMD 100. For example, the display unit 151 may display execution screen information of an application program executing at the HMD 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

A left image and a right image required for implementing a 3D stereoscopic image may be displayed on the stereoscopic display unit by a stereoscopic processing unit. The stereoscopic processing unit may receive the 3D image (an image of a reference time point and an image of an extension time point), and extract the left image and the right image, or may receive 2D images and change them into a left image and a right image.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the HMD 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 may also be implemented to allow the user to feel a tactile effect through a muscle sensation such as the user's head, face, fingers or arm, as well as transferring the tactile effect through direct contact. Two or more haptic modules 153 may be provided according to the particular configuration of the HMD 100.

An optical output module 154 may output a signal for indicating an event generation using light of a light source of the HMD 100. Examples of events generated in the HMD 100 may include a message reception, a call signal reception, a missed call, an alarm, a schedule notice, an email reception, information reception through an application, an output of an image (image, video, etc.) and the like. That is, the optical output module 154 may notify that the HMD 100 is performing a specific operation (function) by the user.

A signal output by the optical output module 154 may be implemented in such a manner that the HMD emits monochromatic light or light with a plurality of colors. The signal output may be terminated in response to the HMD sensing a user's event confirmation, or an operation currently performed in the HMD being ended.

The interface unit 160 serves as an interface for every external device to be connected with the electronic device 100. For example, the interface unit 160 may receive data transmitted from an external device, receive power to transfer to elements and components within the HMD 100, or transmit internal data of the HMD 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the HMD 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the HMD 100 is connected with an external cradle, the interface unit 160 may serve as a passage to allow power from the cradle to be supplied to the HMD 100 or may serve as a passage to allow various command signals input by the user from the cradle to be transferred to the HMD therethrough. Various command signals or power input from the cradle may operate as signals for recognizing that the HMD 100 is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The HMD 100 may also be operated in relation to a network storage device that performs the storage function of the memory 170 over a network, such as the Internet.

Meanwhile, as aforementioned, the controller 180 may typically control operations relating to application programs and the general operations of the HMD 100. For example, the controller 180 may set or release a lock state for restricting a user from inputting a control command with respect to applications when a status of the HMD meets a preset condition.

The controller 180 may also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein on the HMD 100 according to the present invention.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the HMD Body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
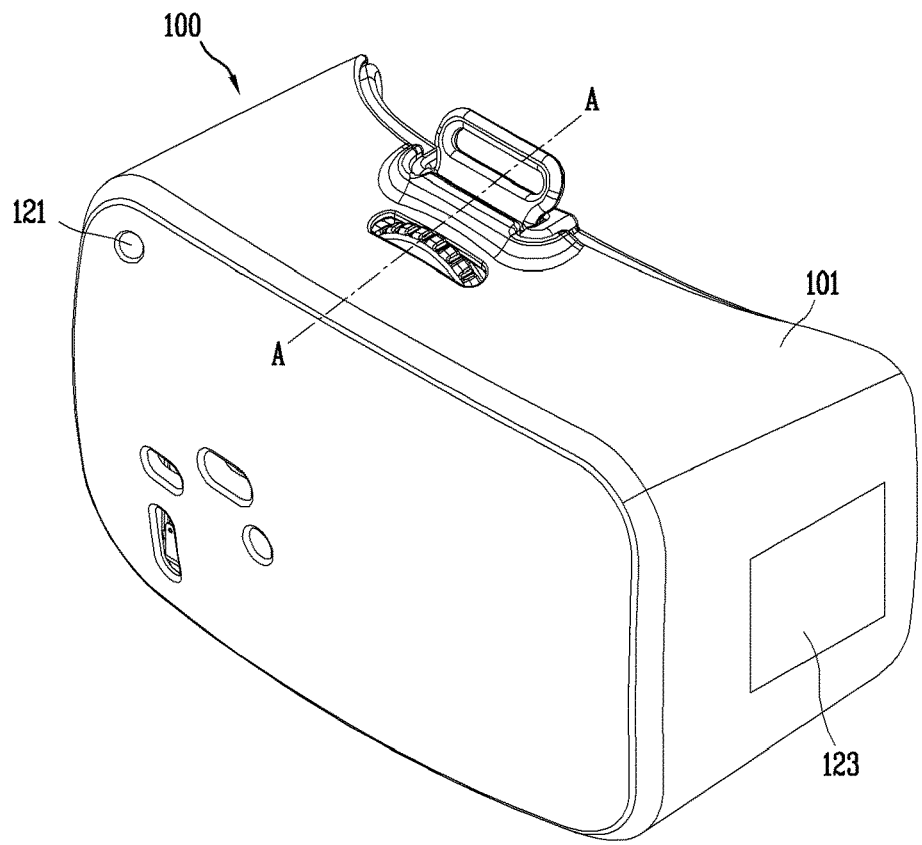
FIG. 2 is a perspective view of an HMD according to the present invention.

FIG. 2 is a conceptual view illustrating an HMD in accordance with the present invention.

An HMD 100 according to the present invention may include at least one of the components described in FIG. 1.

Referring to FIG. 2, the HMD 100 according to the present invention may be formed to be worn on a head portion of a human body (or a head, a face, etc.), and may include a frame unit (a case, a housing, a cover, etc.) for such wearing.

In the drawings, the HMD 100 having a body 101 is illustrated.

The body 101 may be referred to as a main body (or an HMD main body) or a frame (or an HMD body). Here, the HMD main body (or the HMD body) may also be understood as a conception referring to as at least one assembly.

The body 101 may serve to provide a space in which at least one of the components described in FIG. 1 may be disposed.

Specifically, the body 101 is supported on a head portion of a human body and provides a space for mounting various components. As illustrated, electronic components such as a user input unit 123, a camera 121, an output unit (for example, a display unit 151), and a controller (or control unit) 180 may be mounted in the body 101.

The components described in FIG. 1 and components necessary for the HMD 100 may be variously arranged in the body 101 according to a user's choice. In other words, the HMD 100 described herein may have more or fewer components than those listed above.

The controller 180 (see FIG. 1) controls various electronic components provided in the HMD 100. The controller 180 may be understood as a configuration corresponding to the controller 180 described in FIG. 1.

The display unit 151 is mounted on the frame unit and outputs screen information (e.g., image, moving picture, video, etc.) to the front of the user's eyes. When the user wears the HMD 100, the display unit 151 may be arranged to correspond to at least one of the left eye and the right eye so that screen information can be displayed in front of the user's eyes. This drawing illustrates that the display unit 151 is positioned so as to cover both the left and right eyes so that an image can be output toward both the left and right eyes of the user.

Also, the display unit 151 may project an image to the user's eyes using a prism. Further, the prism may be formed to be transmissive so that the user can see the projected image and a general visual field at front (a range looking through the user's eyes) together.

As described above, an image output through the display unit 151 may be viewed in a manner of overlapping a general view. The HMD 100 may provide an Augmented Reality (AR), in which a virtual image is superimposed on a real image or a background to be viewed as a single image, by using the characteristics of the display.

In addition, the display unit 151 of the HMD 100 according to the present invention may be located inside the main body. Specifically, when the HMD is worn on the user's head, the display unit 151 may be disposed at a position facing the user's eyes inside the HMD.

A camera 121 is disposed adjacent to at least one of the left eye and the right eye, to capture (take, photograph) an image of a front side. Since the camera 121 is disposed adjacent to the eye to face forward, the camera 121 may acquire a scene viewed by the user as an image.

This drawing illustrates that one camera 121 is provided, but the present invention is not limited thereto. The camera 121 may be provided in plurality to acquire a stereoscopic image.

The HMD 100 may include a user input unit 123 configured to receive a control command. For example, the user input unit 123, as illustrated in FIG. 2, may be mounted on one area of the main body of the HMD 100 so as to receive a control command input through a tactile manner such as touch and push in which a user feels a tactile sense. That is, these drawings illustrate that a frame unit is provided with a user input unit 123 employing push and touch input manners.

As another example, the user input unit 123 of the HMD 100 according to the present invention may receive, as a control command, a preset user gesture with respect to the HMD 100, a preset movement of the main body of the HMD 100, and the like. To this end, the user input unit 123 may include at least one sensor. For instance, the user input unit 123 may include a gyro sensor or an acceleration sensor for detecting movement such as rotation or inclination of the main body of the HMD 100. In addition, the user input unit 123 may further include a camera or an infrared sensor for detecting a preset gaze of the user as the preset gesture for the HMD 100.

As described above, when a control command is input through the user input unit 123, the controller 180 can control the display unit 151 based on the control command.

Hereinafter, embodiments related to the HMD 100 constructed as above will be described with reference to the accompanying drawings. It will be apparent to those skilled in the art that the present invention may be embodied in other specific forms without departing from the spirit or essential characteristics thereof.

The HMD 100 according to one embodiment of the present invention may output an image in various ways. For example, the HMD 100 may output an image in a see-through manner. Here, the see-through manner is a method in which a user can recognize surrounding environments and simultaneously use contents with the HMD 100 on because the display unit 151 outputting screen information is transparent. As another example, the HMD 100 may output an image in a front-light manner. Here, the front-light manner is a method of displaying a reflected image through a reflector such as a mirror without projecting light directly onto the eyes.

In addition, as another example, the HMD 100 may output an image in a see-closed manner. In this case, the see-closed manner is a method of using contents through the display unit 151 which is located at the frontmost position and through which an external environment cannot be seen. In other words, this manner is configured to output screen information through the display unit 151.

Hereinafter, description will be given under assumption that the HMD 100 displays an image in a see-closed manner. In the see-closed manner, the display unit 151 may be configured to be detachable from the HMD 100, and various media (screen information) such as moving pictures and games may be output from an independent device, namely, the display unit 151.

Figure 3:
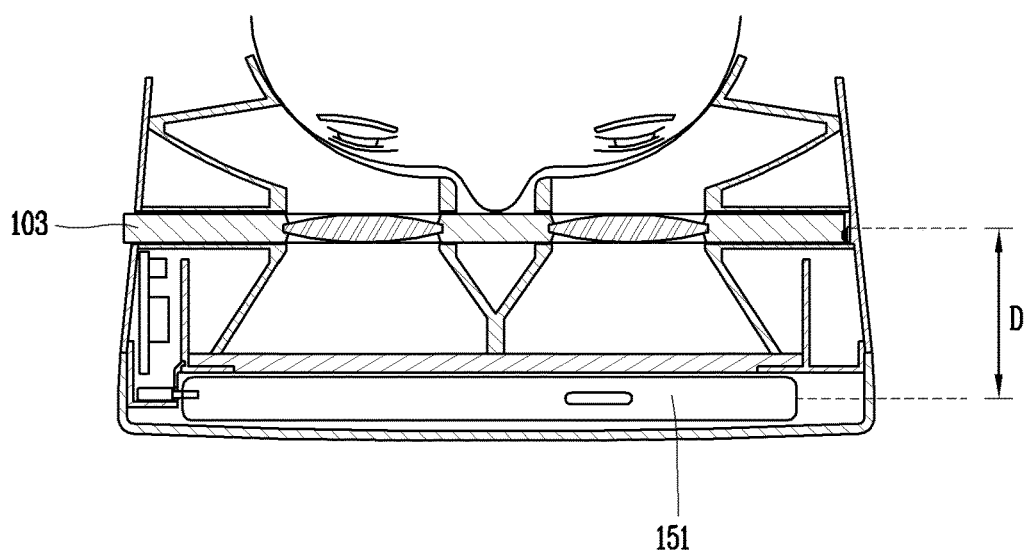
FIG. 3 is a sectional view of an HMD according to the present invention.

Referring to FIG. 3, the HMD 100 according to the present invention may include a lens unit 103 to allow a user to see all screen information output from the display unit 151 formed inside the HMD main body.

That is, the HMD 100 according to the present invention may be configured to transmit all screen information (or light) output from the display unit 151 to the user's eyeballs (or visual field) through the lens unit 103.

For example, the lens unit 103 may be disposed to correspond to at least one of the user's eyes (i.e., the left eye and the right eye). Also, the lens unit 103 may be disposed between the user's eyeballs and the display unit 151 when the user puts the HMD on the head. In addition, the lens unit 103 may be formed as a concave lens or a convex lens, or a combination thereof.

Referring to FIG. 3, an HMD 100 according to the present invention may be configured to have a variable distance D between the lens unit 103 and the display unit 151. Hereinafter, this will be described in more detail with reference to the drawings.

Methods of varying the distance D between the lens unit 103 and the display unit 151 may include a method of moving the display unit 151 with the lens unit 103 fixed, a method of moving only the lens unit 103 with the display unit 151 fixed, or a method of moving the lens unit 103 and the display unit 151 simultaneously. In one embodiment of the present invention, the case of moving only the display unit 151 with the lens unit 103 fixed will be mainly described. However, the scope of the present invention is not limited thereto.

If a position of a lens is adjusted, positions of the eyes and the lens are not maintained and a distance between them gets farther. Accordingly, an image viewed through the lens of a display may become smaller, and consequently a field of view (FOV) may become smaller. However, in one embodiment of the present invention, a focal point may be adjusted by moving a position of the display so that the distance between the eyes and the lens can be maintained, thereby maintaining the FOV.

Figure 4:
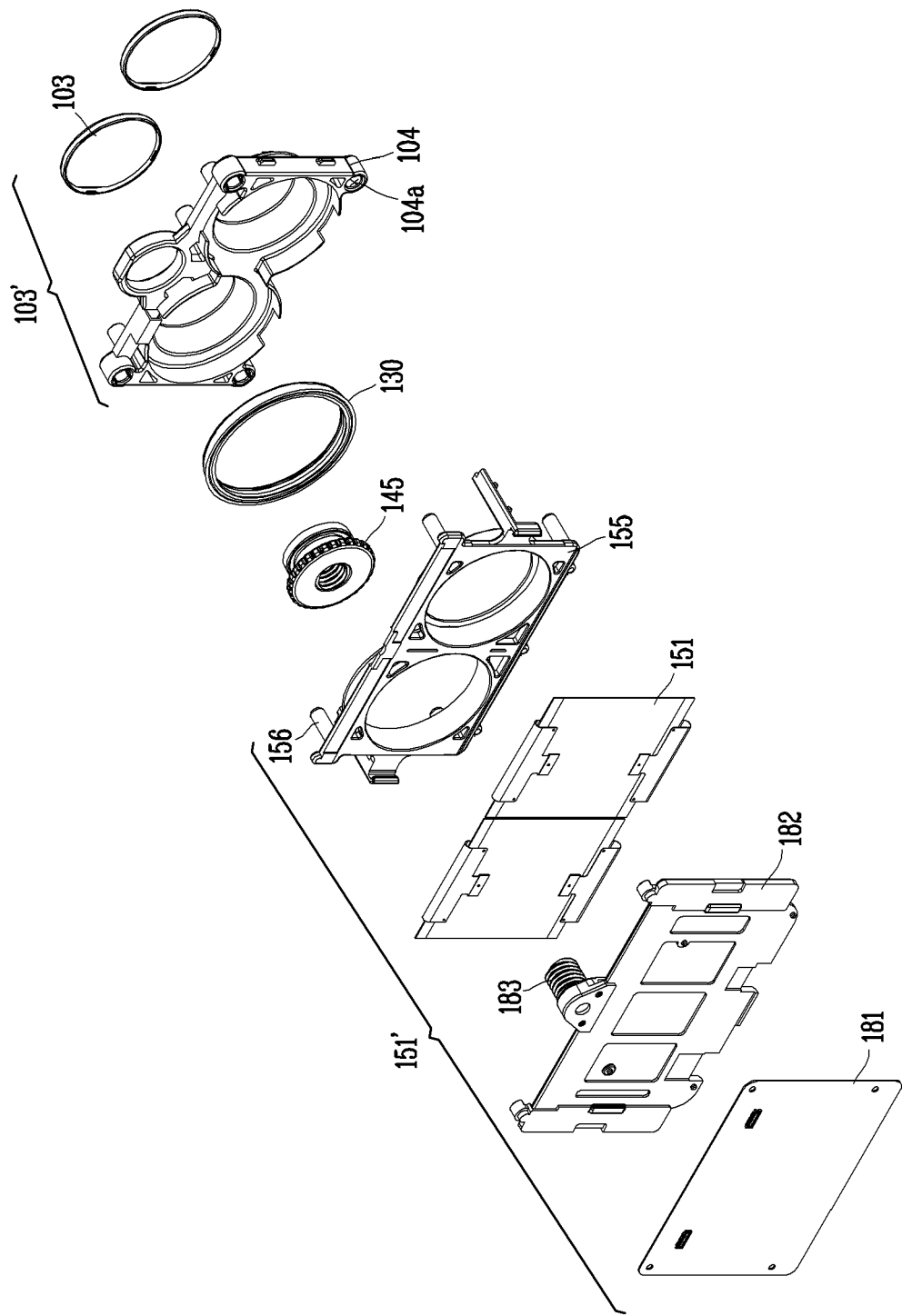
FIG. 4 is an exploded perspective view of major components of an HMD in accordance with one embodiment of the present invention.
Figure 5:
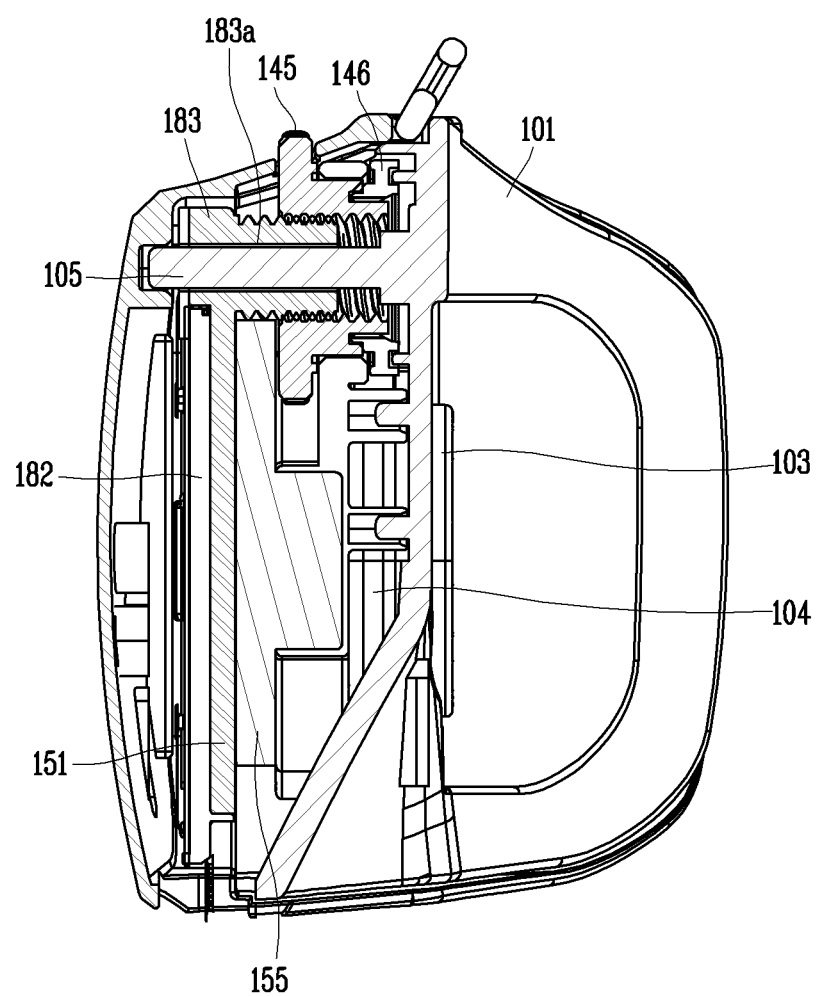
FIG. 5 is a sectional view taken along the line AA of FIG. 2.

FIG. 4 is an exploded perspective view of major components of an HMD according to the present invention, and FIG. 5 is a sectional view taken along the AA line of FIG. 2.

Hereinafter, description will be given with reference to FIGS. 4 and 5.

An HMD according to one embodiment of the present invention may include a body 101 in which electronic components are embedded, a display unit 151' provided in the body 101 and having a display 151 on one side thereof, a lens unit 103' whose focal point is adjusted by relative movement of the display unit 151', and a sealing portion 130 provided between the display unit 151' and the lens unit 103' so that a space therebetween is hermetically sealed.

In one embodiment of the present invention, the lens unit 103' is fixed while the display unit 151' is moved to adjust a focal point. At this time, foreign materials such as dust may be introduced into the HMD 100 through a space between the lens unit 103' and the display unit 151'. This embodiment of the present invention relates to a structure for preventing introduction of such foreign materials.

Figure 6A:
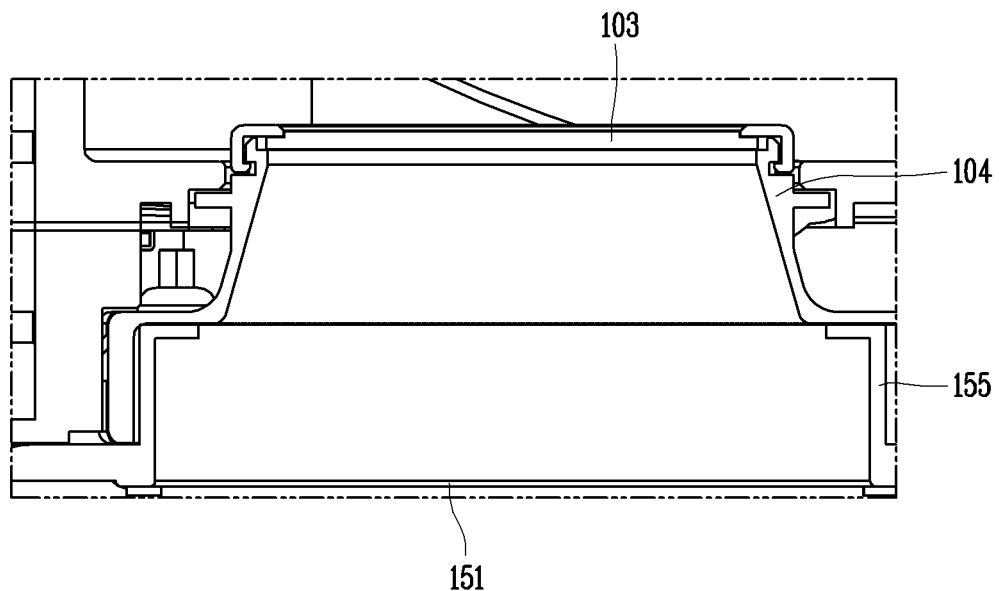
FIGS. 6A and 6B are views illustrating movement of a display unit according to one embodiment of the present invention.
Figure 6B:
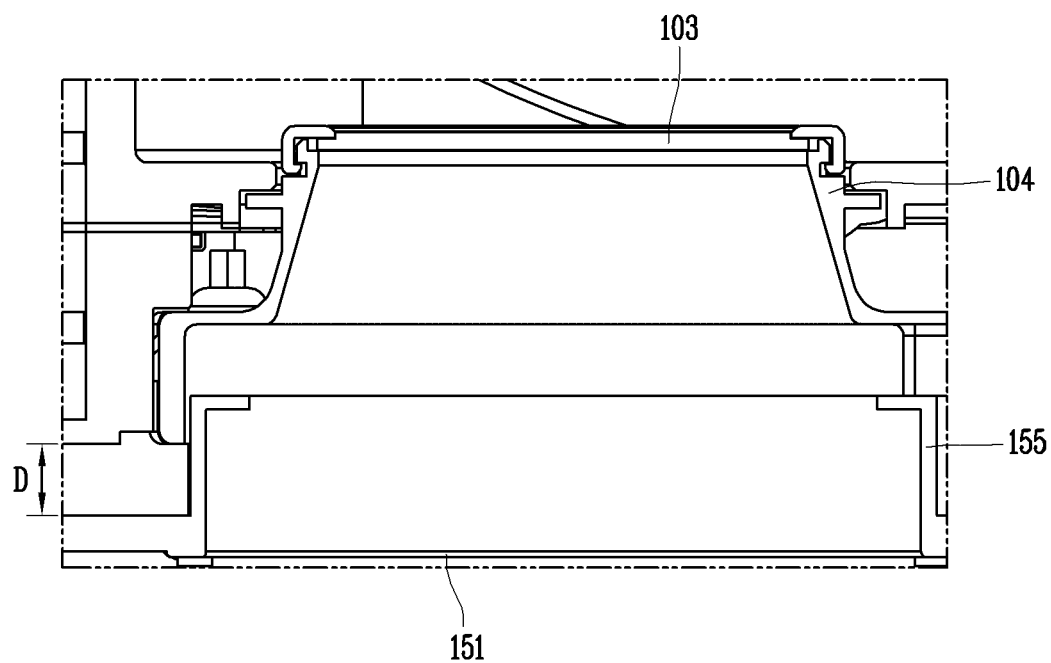
Figure 7:
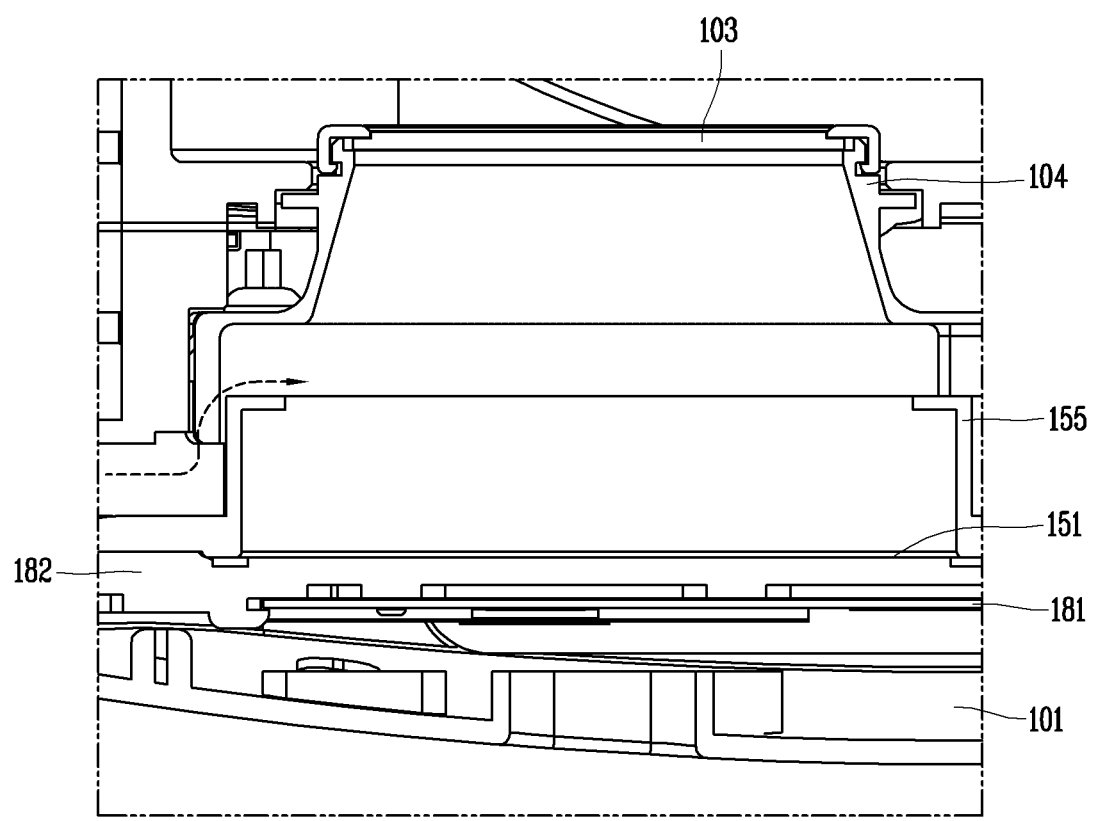
FIG. 7 is a view illustrating a path through which foreign materials are introduced into a space generated by movement of a display unit according to one embodiment of the present invention.

FIGS. 6A and 6B are views illustrating movement of a display unit 151' according to one embodiment of the present invention, and FIG. 7 is a view illustrating a path through which foreign materials are introduced into a space generated by the movement of the display unit 151'. As illustrated in FIGS. 6A to 7, a space is generated between the display 151 and the lens 103 when moving the display 151, and foreign materials may be introduced into the space.

The sealing portion 130 is configured to prevent foreign materials from being introduced into the space between the display unit 151' and the lens unit 103'. At least one end portion of the sealing portion 130 is coupled to an outer circumferential surface of the display unit 151', and is expanded or contracted according to movement of the display unit 151' so as to prevent introduction of foreign materials into the space between the display unit 151' and the lens unit 103'.

In addition, the HMD 100 according to one embodiment of the present invention includes a wheel 145 coupled to the body 101 and threaded on an outer circumferential surface thereof, and a screw 183 coupled to the wheel 145 for converting a rotational motion of the wheel 145 to a linear motion. The wheel 145 is disposed on an upper side of the HMD 100 so that the user can easily operate it.

A through hole 183a is formed through the screw 183, and a fixing shaft 105 protruding from the body 101 to be inserted through the through hole 183a. The screw 183 can be more firmly supported by the fixing shaft 105.

As described above, in one embodiment of the present invention, when the wheel 145 is rotated to adjust the focal point of the HMD 100, a rotational motion of the wheel 145 is converted to a linear motion by the screw 183. Then, the linear motion is transferred to a frame 182 that is coupled to the screw 183 and moves together with the display 151 according to movement of the screw 183. At this time, components moved by the rotation of the wheel 145 are the display 151, a display barrel 155 provided with the display 151, and the frame 182 provided with the display barrel 155. A part including these components will be referred to as a display unit 151' in this embodiment. The part including the components may also be referred to as a moving unit since they are moved by the rotation of the wheel 145. And a wheel cap 146 is provided between the wheel 145 and the body 101 to seal a space between the wheel 145 and the body 101.

Like this, in this embodiment, not only the display 151 but also other components adjacent to the display 151 move together. Therefore, rotational force of the wheel 145 needs to be evenly transferred.

For this, in one embodiment of the present invention, guide shafts 156 for guiding movement of the frame 182 are formed at a plurality of positions of the frame 182, and the frame 182 is moved on the guide shafts 156. For example, the guide shaft 156 may be formed at four corners of the body 101 (See FIG. 9A). At this time, the guide shafts 156 may alternatively be formed on the body 101, and the frame 182 is a plate having a certain amount of strength on which a circuit board 181 is mounted.

The guide shafts 156 are provided at a plurality of positions of the frame 182 so that force is evenly transferred to the frame 182, thereby preventing tilting of the frame 182.

Figure 9A:
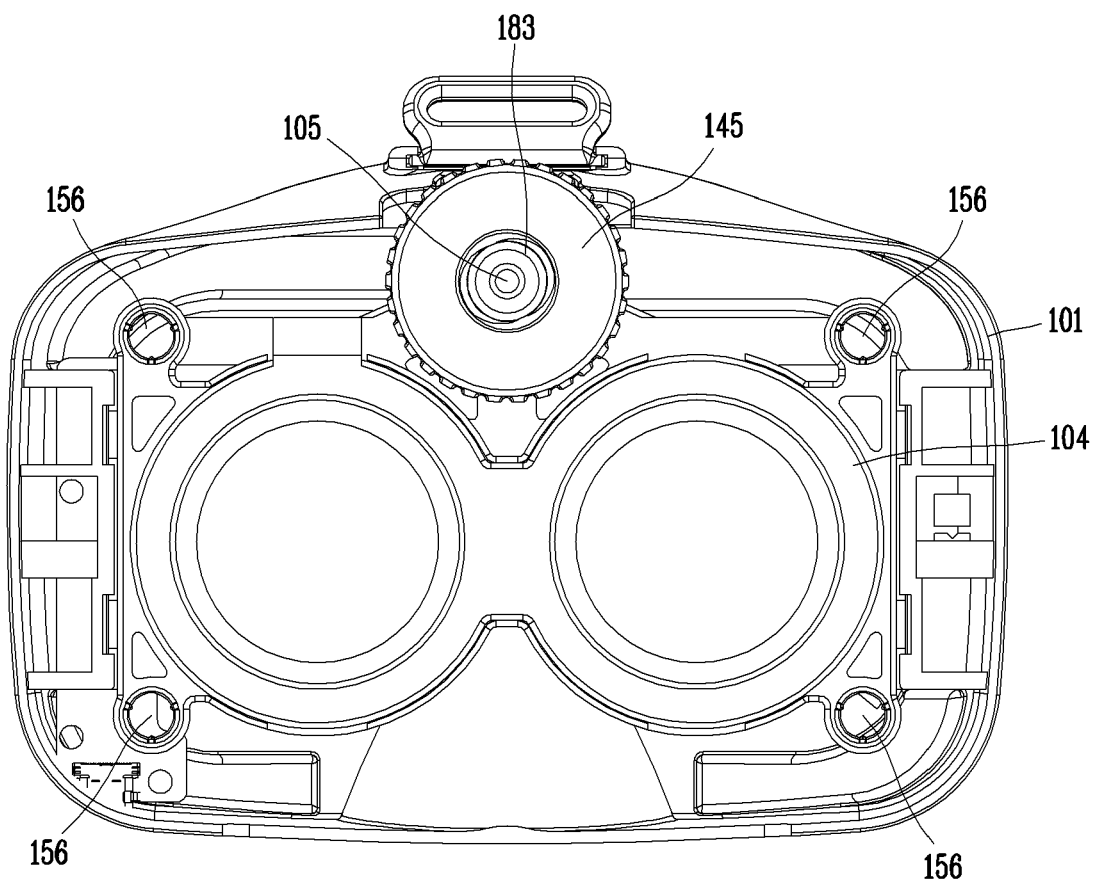
FIG. 9A is a sectional view illustrating a state where a display is removed from an HMD according to one embodiment of the present invention.
Figure 9B:
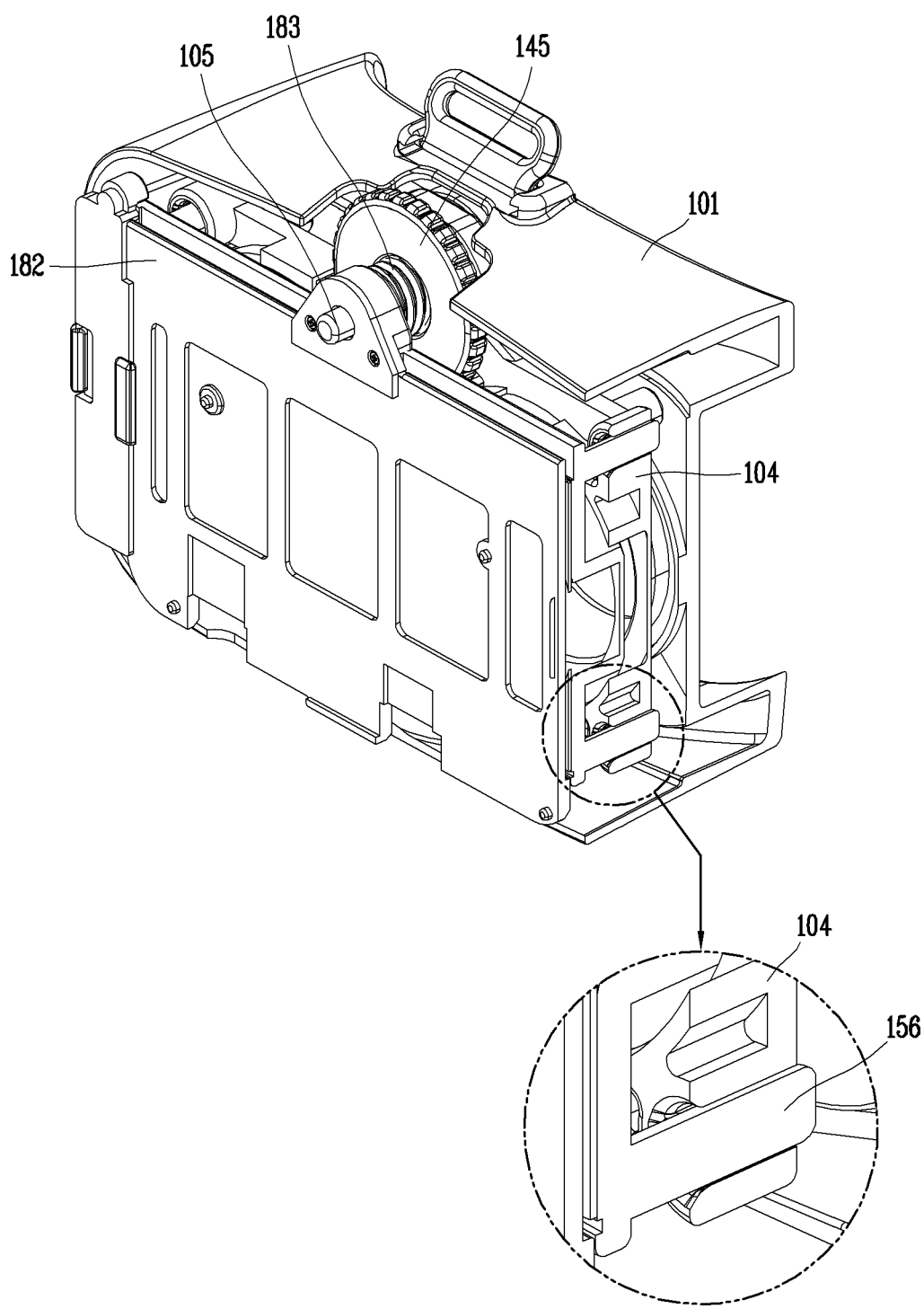
FIG. 9B is a view illustrating a portion to which a lens barrel and a display barrel are connected in the HMD according to one embodiment of the present invention.
Figure 10:
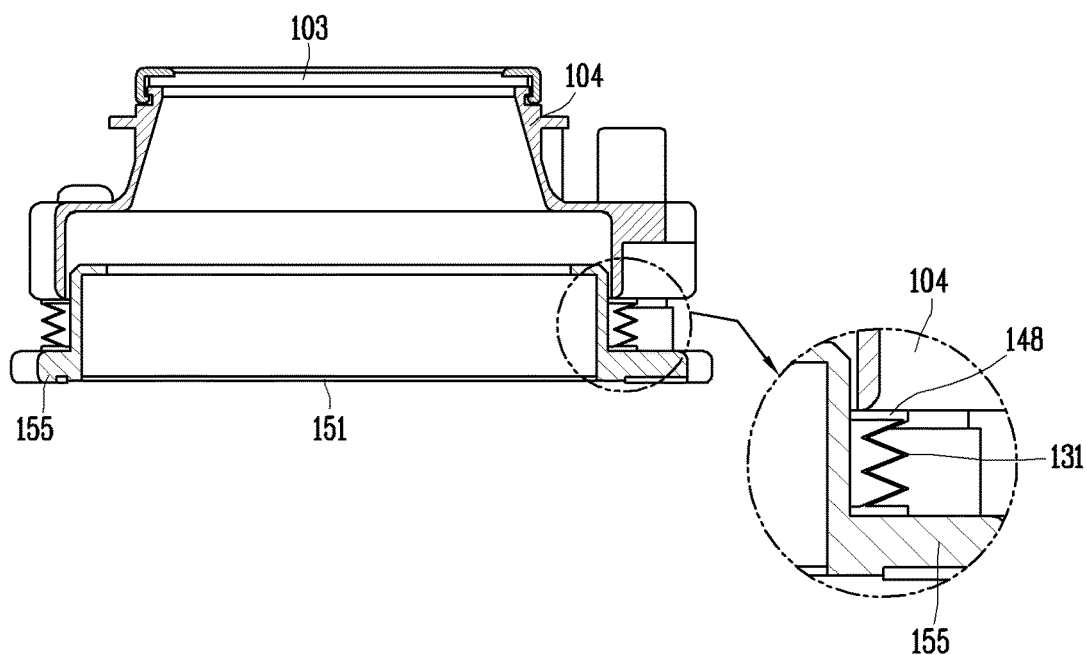
FIGS. 10 to 14 are views illustrating a structure for sealing a gap between a display unit and a lens unit in accordance with one embodiment of the present invention.

FIG. 9A is a sectional view in a state where the display 151 is removed from the HMD 100 according to the one embodiment of the present invention. FIG. 9B is a view illustrating a portion to which a lens barrel and a display barrel are connected in the HMD 100 according to the one embodiment of the present invention.

As illustrated in 9A and 9B, the guide shafts 156 are formed at the four corners of the HMD 100, and the guide shafts 156 are configured to move along through holes 104a (See FIG. 4) formed through the lens barrel 104.

Figure 8A:
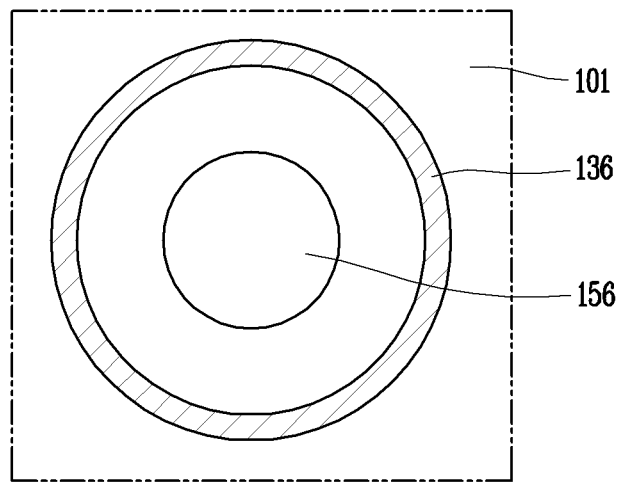
FIGS. 8A to 8C are exemplary views illustrating a method for preventing tilting of a guide shaft according to one embodiment of the present invention.
Figure 8B:
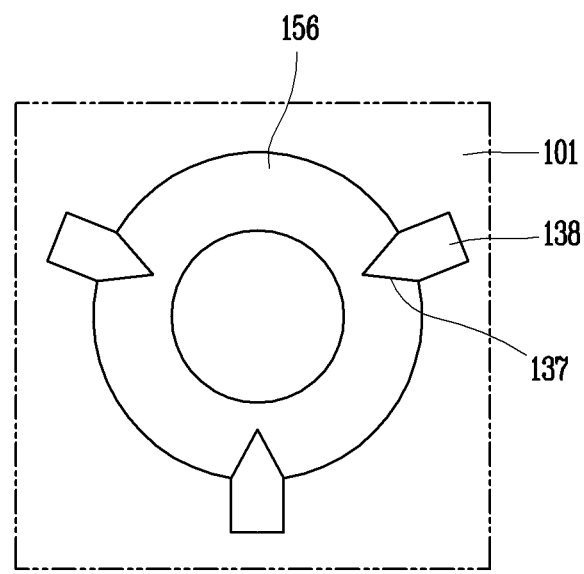
Figure 8C:
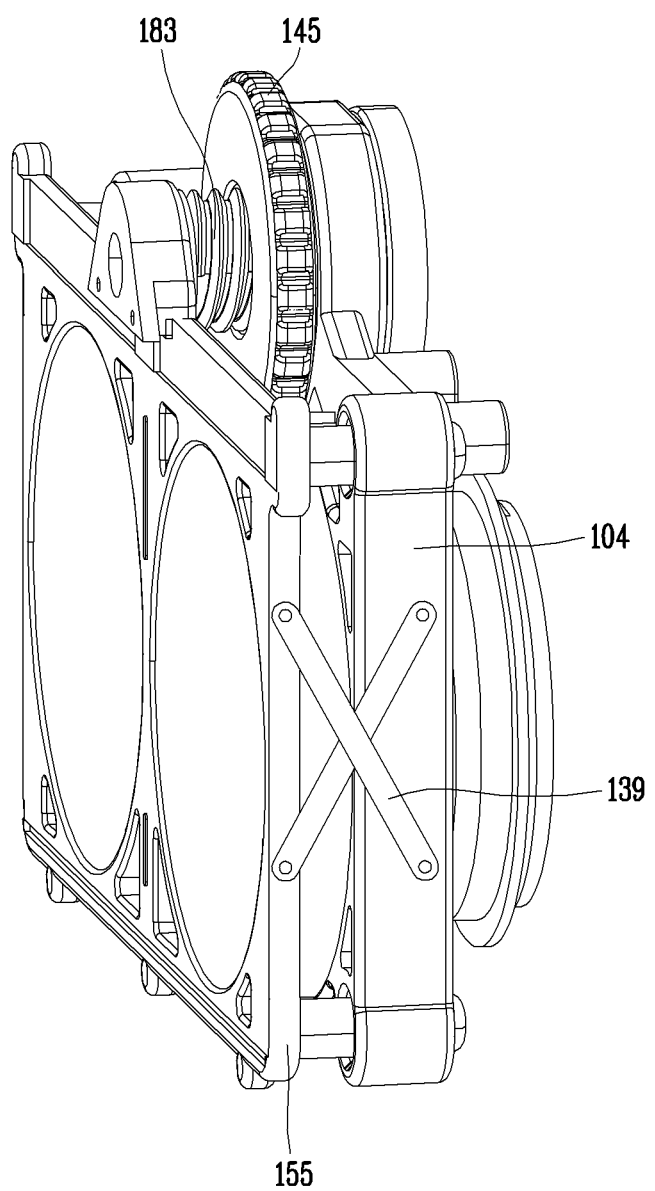

In addition, in one embodiment disclosed herein, a method for moving the frame 182 without being tilted is provided. FIGS. 8A to 8C are views illustrating an exemplary method for preventing tilting of the guide shaft 156 according to one embodiment of the present invention.

As shown in FIG. 8A, a bushing 136 is provided on an outer circumference of each guide shaft 156 so as to maintain airtightness of a space between the body 101 and the guide shaft 156.

Also as illustrated in 8B, at least one groove 137 are formed on an outer circumference of the guide shaft 156. A pin 138 having a shape corresponding to the groove 138 may be provided on an inner circumferential surface of the body 101 on which the guide shaft 156 moves. The groove 137 and the pin 138 are preferably provided in plurality, respectively, formed at predetermined angles with respect to a center of the guide shafts 156. At this time, the pin 138 slidably moves on the groove 137. FIG. 8B illustrates the grooves 137 and the pins 138 are formed at three positions, respectively, at 120° intervals. As shown in FIG. 8B, the pin 137 may be formed in a wedge shape.

In addition, as shown in FIG. 8C, a link member 139 is formed having one side fixed to the lens unit 103' and another side fixed to the display unit 151' to support a smooth linear motion of the frame 182. At this time, the link member 139 may be a pentagraph link 139, and the lens unit 103' should be fixed to the body 101. More specifically, one end portion of the pentagraph link 139 is coupled to the lens barrel 104 and another end portion thereof is coupled to the display barrel 155 so that force applied between the display barrel 155 and the lens barrel 104 is evenly distributed. The pentagraph link 139 has a substantially X-shaped structure.

In this way, the use of the pentagraph link 139 may result in preventing force from being concentrated at a specific point.

Meanwhile, FIGS. 10 to 14 illustrate a schematic structure for sealing a gap or space between the display unit 151' and the lens unit 103' according to one embodiment of the present invention.

Hereinafter, the sealing portion 130 provided between the display unit 151' and the lens unit 103' will be described with reference to FIGS. 10 to 14.

As illustrated in FIGS. 10, 11, 13 and 14, one end portion of the sealing portion 130 is coupled to the display unit 151', more precisely, to an outer circumferential surface of the display 151, and another end portion thereof may be coupled to the lens unit 103', more precisely, to an outer circumferential surface of the lens barrel 104. A rubber is suitable for the sealing portion 130 considering elasticity. The sealing portion 130 may alternatively be implemented as a corrugate tube 131 considering elasticity. In the case of the corrugate tube 131, the sealing portion 130 may not necessarily be a rubber. At this time, the corrugated tube 131 is in a substantially cylindrical shape, and both end portions of the corrugated tube 131 are attached by an adhesive 148 to the lens barrel 104 and the outer circumferential surface the display 151.

Owing to this structure, airtightness can be maintained in the space between the lens barrel 104 and the display barrel 155 even when the display 151 or the display unit 151' is moved.

Figure 11:
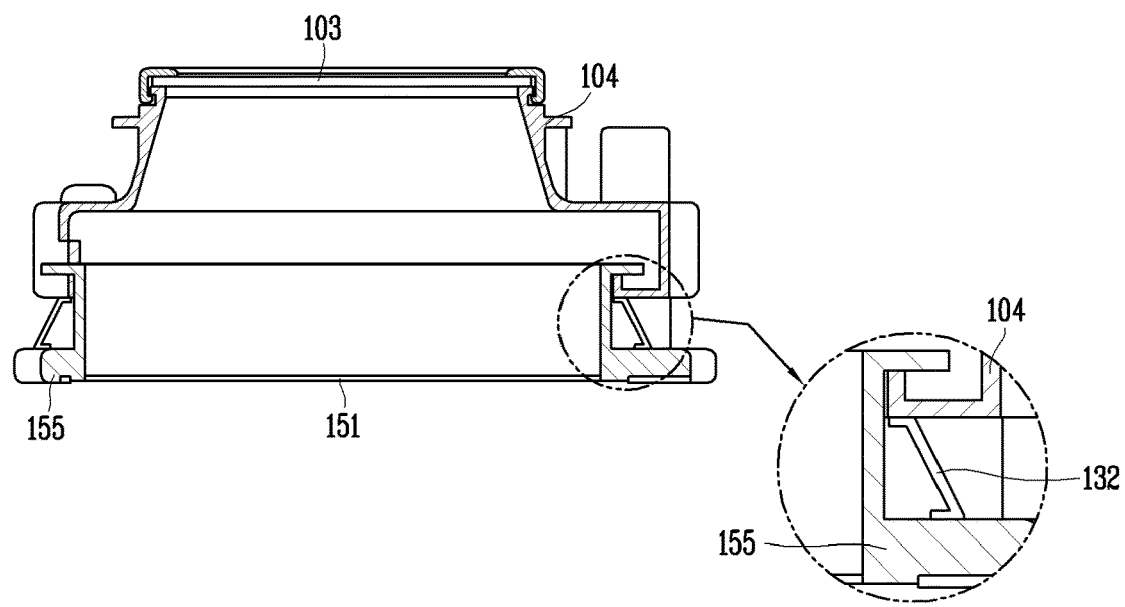
Figure 13:
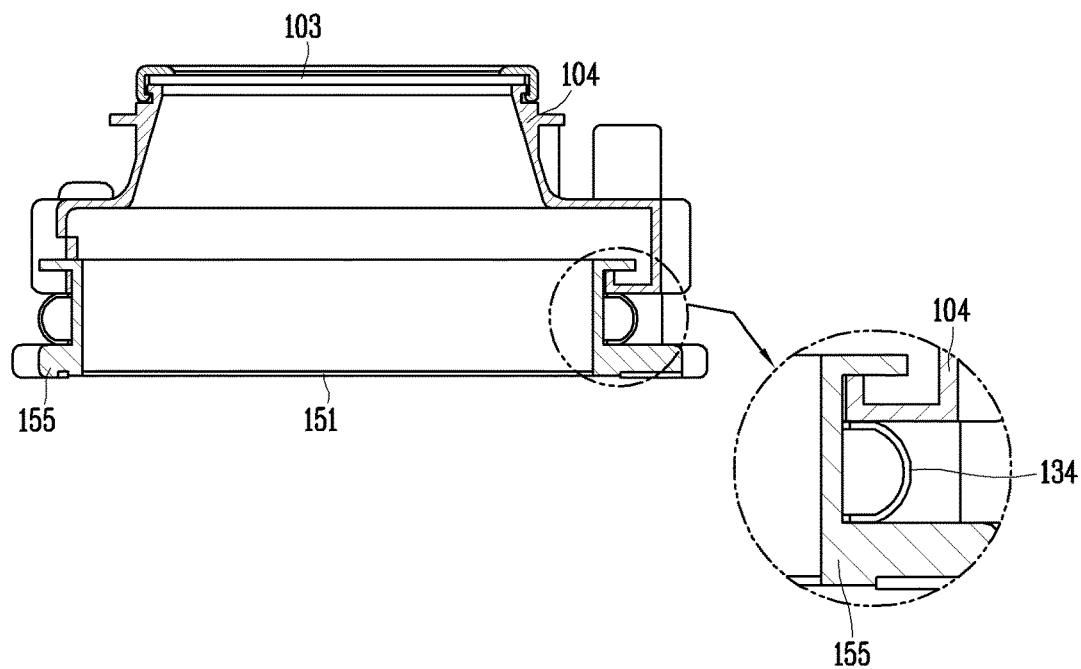

In addition, as shown in FIG. 11, a diameter of the sealing portion 130 may be changed along one direction. FIG. 11 illustrates a state where the display unit 151' and the lens unit 103' are spaced apart from each other by a maximum distance. The distance therebetween may be narrowed according to movement of the display unit 151'. When the display unit 151' is moved, the sealing portion 132 is bent into an arcuate shape, thereby blocking external foreign materials. This is similar to a sealing portion 134 of FIG. 13. The sealing portion 134 of FIG. 13 is a convex curve structure that curves outwards. On the other hand, the sealing portion 132 of FIG. 11 is a skirt shape, so positions where both end portions of the sealing portion are coupled to the display barrel 155 and the lens barrel 104 are different. That is, the coupled position in FIG. 13 is parallel to a central axis of the lens barrel 104 while the coupled position in FIG. 11 is located in a direction intersecting with the central axis of the lens barrel 104.

Figure 12:
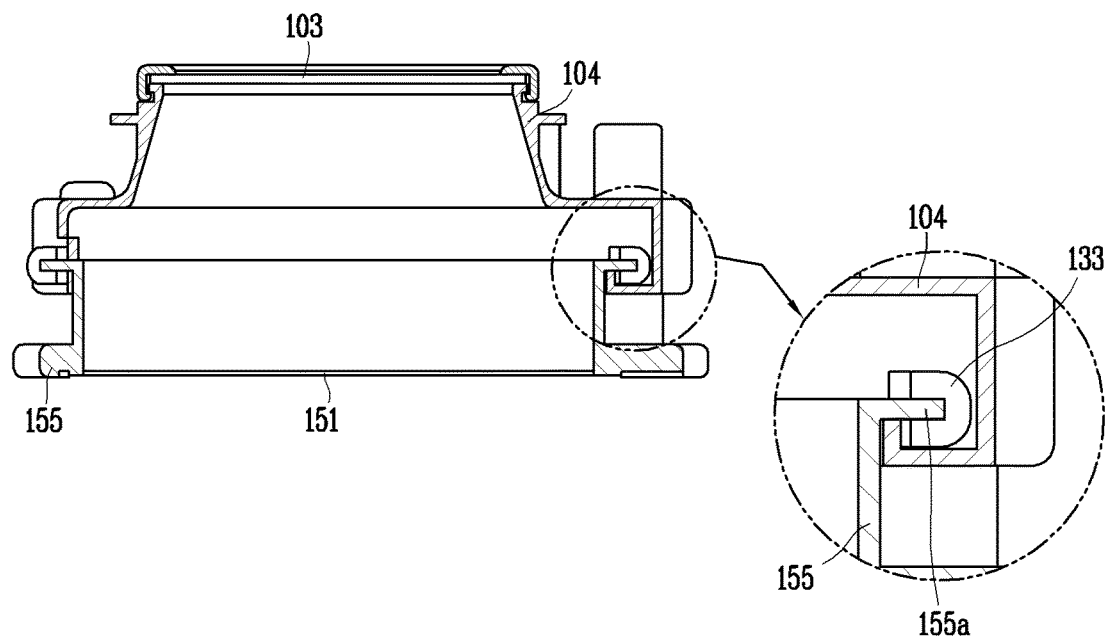

Meanwhile, as illustrated in FIG. 12, a flange portion 155a is formed on an outer circumferential surface of the display unit 151', and an O-ring 133 that covers the flange portion 155a and moves on an inner circumferential surface of the lens unit 103' may be provided. At this time, the O-ring 133 is provided at an end portion of the display barrel 155.

As the display unit 151' is moved by the O-ring-shaped sealing portion 133 formed on the flange portion 155a, the sealing portion 133 comes into contact with the inner circumferential surface of the lens barrel 104 so that a space between the lens barrel 104 and the display barrel 155 is sealed. FIG. 12 illustrates a state where the lens barrel 104 and the display barrel 155 are spaced apart from each other by a maximum distance.

Figure 14:
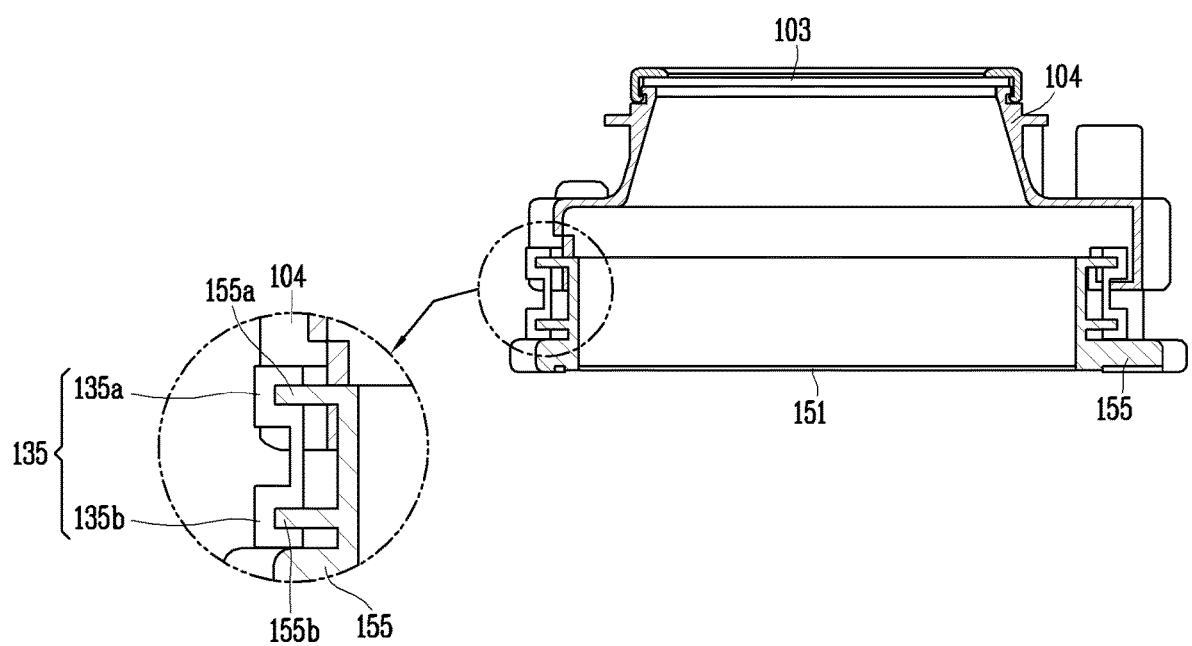

In addition, as illustrated in FIG. 14, in one embodiment of the present invention, the flange portion 155a is formed on the outer circumferential surface of the display barrel 155. One end portion 135a of the sealing portion 135 covers the flange portion 155a, and another end portion 135b may be in close contact with the display barrel 155. At this time, a protrusion 155b is formed on the display barrel 155, and the one end portion 135a of the sealing portion 135 covers the flange portion 155a formed on an upper side of the display barrel 155 and another end portion 135b of the sealing portion 135 may be in close contact with the protrusion 155b formed on a lower side of the display barrel 155. At this time, the protrusion 155b is provided to allow the sealing portion 135 to be more closely engaged with the display barrel 155, and thus may be a flange portion 155b having the same shape as that of the flange portion 155a.

This is the same as the sealing portion 133 of FIG. 12, which is formed in an up and down direction, and the sealing portion 135 may be made of a rubber material. This configuration can be achieved by the combination of FIG. 12 and FIG. 13 described above. In other words, FIG. 14 illustrates a state where the display barrel 155 and the lens barrel 104 are spaced apart from each other by a maximum distance. As described with reference to FIG. 13, a central portion of the body 135 swells as the display barrel 155 moves. As a result, introduction of foreign materials such as dust is blocked while the display unit 151' is moving.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

INDUSTRIAL AVAILABILITY

Embodiments of the present invention may be applied to a focal point-adjustable HMD.

The invention claimed is:

1. A head mounted display (HMD) device, comprising;
a body;
a display barrel provided on the body and having a display disposed on one side thereof;
a lens barrel configured to adjust a focal point by relative movement to the display barrel; and
a sealing portion provided between the display barrel and the lens barrel to maintain airtightness of a space between the display barrel and the lens barrel,
wherein the sealing portion has at least one end portion coupled to an outer circumferential surface of the display barrel, and is expanded and contracted according to movement of the display barrel.

2. The head mounted device of claim 1, further comprising:
a wheel coupled to the body and threaded on an outer circumferential surface thereof;
a screw coupled to the wheel so as to convert a rotational motion of the wheel to a linear motion; and
a frame coupled to the screw so as to move together with the display barrel according to movement of the screw.

3. The head mounted device of claim 2, wherein the frame is provided with guide shafts formed on a plurality of positions thereof to guide movement of the frame, and
wherein the frame is moved on the guide shafts.

4. The head mounted device of claim 3, wherein each of the guide shafts is provided with a bushing on an outer circumferential surface thereof to maintain airtightness of a space between the body and the guide shaft.

5. The head mounted device of claim 3, wherein each of the guide shafts is provided with at least one groove formed on the outer circumferential surface thereof, and a pin having a shape corresponding to the groove is provided on an inner circumferential surface of the body, on which the guide shaft moves.

6. The head mounted device of claim 3, wherein the lens barrel is fixed to the body, and provided with a link member formed in a pentagraph shape and having one end fixed to the lens barrel and anther end fixed to the display barrel.

7. The head mounted device of claim 1, wherein the sealing portion is formed to have one end portion coupled to the outer circumferential surface of the display barrel and another end portion coupled to an outer circumferential surface of the lens barrel.

8. The head mounted device of claim 7, wherein the sealing portion is a corrugate tube.

9. The head mounted device of claim 7, wherein the sealing portion is a rubber member.

10. The head mounted device of claim 9, wherein the sealing portion is formed in a cylindrical shape that covers the display barrel, and has a diameter varying along one direction.

11. The head mounted device of claim 1, wherein the display barrel is provided with a flange portion formed on the outer circumferential surface thereof, and
wherein the sealing portion is an O-ring that covers the flange portion and moves on an inner circumferential surface of the lens barrel.

12. The head mounted device of claim 1, wherein the display barrel is provided with a flange portion formed on the outer circumferential surface thereof, and
wherein the sealing portion is a rubber member having one end portion covering the flange portion and another end portion closely attached to the display barrel.

13. The head mounted device of claim 2, further comprising a wheel cap provided between the wheel and the body.

14. The head mounted device of claim 3, wherein the guide shaft slidably moves along a through hole formed through the body.

* * * * *